United States Patent [19]

Caillet

[11] 4,159,027
[45] Jun. 26, 1979

[54] FLEXIBLE HOSE FOR CONNECTING SANITARY APPLIANCES

[76] Inventor: Pierre G. Caillet, 28 Avenue Gambetta, 92270 Bois Colombes, France

[21] Appl. No.: 791,464

[22] Filed: Apr. 27, 1977

Related U.S. Application Data

[63] Continuation-in-part of Ser. No. 637,866, Dec. 4, 1975, abandoned.

[30] Foreign Application Priority Data

Feb. 27, 1975 [FR] France .............................. 75 06096

[51] Int. Cl.² .............................................. F16L 11/00
[52] U.S. Cl. .................................. 138/127; 138/109; 138/123
[58] Field of Search ................... 138/127, 96 R, 96 T, 138/126, 127, 125, 109

[56] References Cited

U.S. PATENT DOCUMENTS

| | | | |
|---|---|---|---|
| 1,630,895 | 5/1927 | Harbst | 138/127 X |
| 1,649,139 | 11/1927 | Sonan | 138/127 X |
| 1,651,022 | 11/1927 | Fulton | 138/127 X |
| 1,692,255 | 11/1928 | Fulton | 138/127X |
| 1,762,548 | 6/1930 | Davis | 138/127 |
| 2,305,644 | 12/1942 | Stone | 138/127 |
| 2,829,671 | 4/1958 | Ernst et al. | 138/127 X |
| 3,580,289 | 5/1971 | James, Jr. | 138/127 X |
| 3,791,415 | 2/1974 | Lawless et al. | 138/127 |
| 3,828,112 | 8/1974 | Johansen et al. | 138/127 X |
| 3,886,980 | 6/1975 | Elson | 138/127 |

FOREIGN PATENT DOCUMENTS 510052  6/1955  Italy .......................................... 138/127

*Primary Examiner*—Henry K. Artis
*Attorney, Agent, or Firm*—Millen & White

[57] ABSTRACT

A hose for connecting a sanitary appliance, such as a lavatory supplied with water, to the distribution network, this connection hose being constituted by a tubular core made of supple elastomeric material, an outer protective sheath formed of braided metallic wire, and two couplings secured at the end of said hose for connection by one end to said appliance and by the other end said distribution network, in which said elastomeric core is prepared according to the following formula:
  ethylene propylene copolymer resin: 20 to 30%
  paraffin-oil: 20 to 40%
  carbon black: 40 to 60%
and said sheath is constituted by a braid of strands of stainless steel wires, each strand comprising between 3 and 8 parallel wires, the strands forming intersecting helices, each strand following a line forming an angle comprised between 35 and 50° with respect to the axis of said hose, the strands surrounding the elastomeric core without discontinuity, ensuring a continuous coating around said elastomeric core.

4 Claims, 7 Drawing Figures

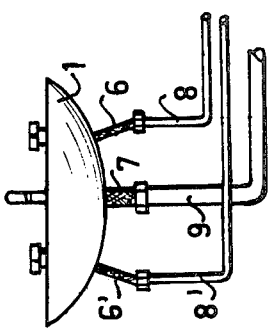
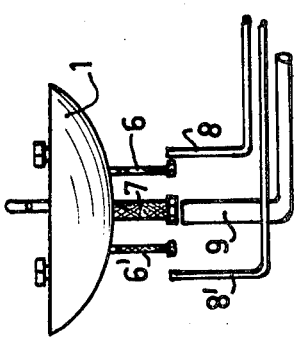
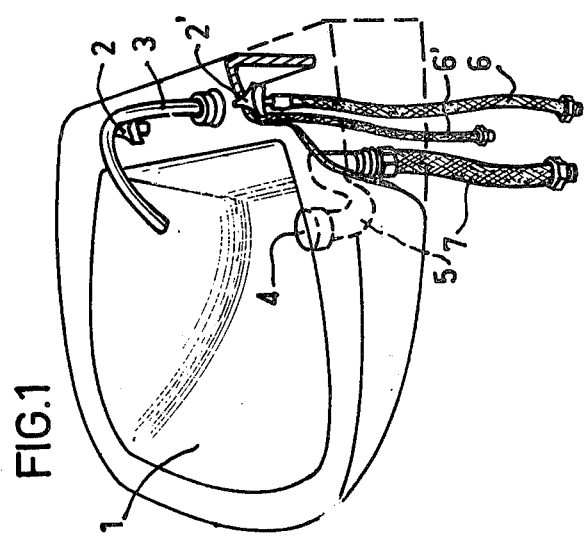
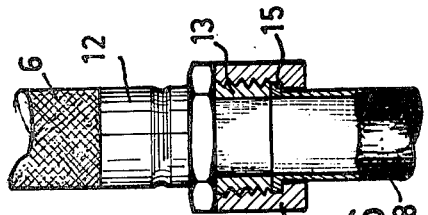
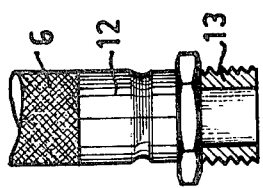
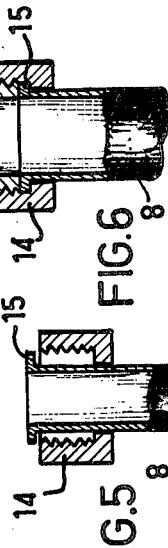
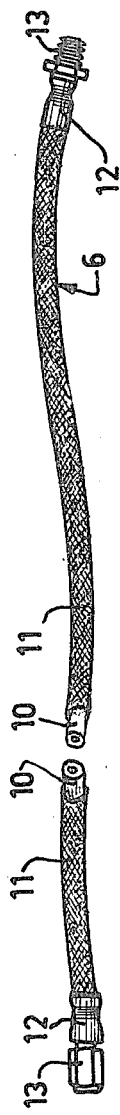

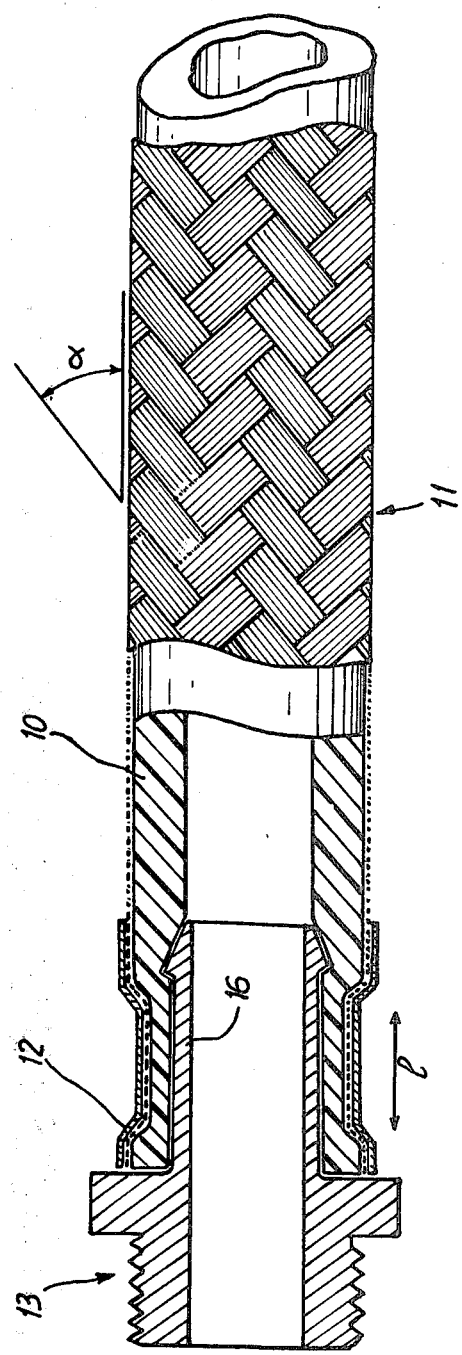

FLEXIBLE HOSE FOR CONNECTING SANITARY APPLIANCES

This application is a continuation-in-part of Application Ser. No. 637,866, filed Dec. 4, 1975 and now abandoned.

The present invention relates to a hose for connecting appliances supplied with domestic water to the end of the fixed water supply pipe.

The invention is applied more particularly to the connections of sanitary appliances such as washstand sinks, showers, W.C.s, bathtubs, etc.

It is an object of the invention to allow the rapid connection of sanitary appliances of the above-mentioned type to the end of the fixed water intake pipe, avoiding the delicate and difficult operations which were necessitated by the positioning of a conventional bent union.

Another object of the invention is to allow a sanitary appliance of the type mentioned hereinabove to be supplied with domestic water, avoiding the transmission of noise due to the vibrations provoked by the passage of the water when the faucet is turned on, from the appliance in question to the whole distribution network.

In fact, it is known that the connection of a domestic appliance when it is installed, is effected according to conventional methods by using a pipe (such as a copper pipe) which is suitably bent so as to adapt itself to the end of the water distribution pipe on the one hand and to the water supply intake on the appliance on the other hand; the personnel must therefore make precise measurements, cut the copper pipe accordingly, shape it and finally connect it by welding.

The invention intends to eliminate these operations by allowing a rapid and virtually instantaneous connection.

Furthermore, the connections of appliances supplied with domestic water using metal pipes have the drawback of transmitting the vibrations coming from the sanitary appliance (when the faucet is turned on) to all the installation; it follows that the use of a faucet of poor quality on the appliance produces vibrations which are transmitted in the adjacent apartments and possibly even in the whole building. The invention remedies these drawbacks and enables a connecting means to be installed which avoids the transmission of the vibrations from each individua appliance to the whole of the network of pipes.

To this end, the invention provides a connecting means of the flexible hose type.

Flexible pipes are known which are intended for connecting a sanitary appliance and the distribution network, which connection is constituted by a copper tubular structure comprising corrugated walls enabling the pipe thus formed to have a certain suppleness and to be able to be manually bent to be easily adapted to the position of the fluid intake on the appliance and the position of the end of the distribution pipe; however, in order to be flexible, this type of tube has an extremely thin metallic wall, which is fragile, and cracks easily form on the walls thereof if it undergoes several successive flexions (for example further to accidental movements); furthermore, this metal tube allows many of the parasitic vibrations produced at the faucet to pass towards the distribution network.

U.S. Pat. No. 2,817,094 also describes a sanitary installation in which the intake of the hot and cold water is ensured through flexible fluid lines; however, this patent does not give specific precision concerning the structure of these flexible fluid lines.

U.S. Pat. No. 3,791,415 also discloses a longitudinally resilient flexible hose intended for connecting sanitary appliances on a distribution circuit in light, transportable habitations such as boats, caravans, aircraft, etc.

The longitudinally resilient flexible hose described in U.S. Pat. No. 3,791,415 comprises a core formed by an elastomeric tube surrounded externally by an open wire braid with a determined pitch (70°) and itself surrounded by a sheath of fiber yarn braid with a pitch of 55°.

U.S. Pat. No. 3,791,415 essentially intends to avoid breakage of pipes in the case of the water imprisoned therein freezing, the hose enabling the increased volume of water converted into ice to be accommodated by longitudinal extension.

U.S. Pat. No. 3,791,415 therefore does not envisage solving the problems raised by the necessity of a rapid positioning of the sanitary appliance when the dwelling is constructed and the elimination of the transmission of parasitic noise to the whole of the building through the distribution network.

The longitudinally resilient flexible hose of U.S. Pat. No. 3,791,415 is specifically designed to allow the intake of cold water and to allow the volume of the hose to increase in case of freezing and to be adapted to the increased volume. To this end, the metallic sheath surrounding the elastomeric core is provided to be with an angle of 70° which sheathes the elastomeric core, firmly opposing a radial extension (increase in the diameter) of the elastomeric core in the case of increase in the pressure; on the contrary, the pitch of the sheath allows a considerable longitudinal elasticity, which is sought after by said patent. The metallic sheathing which surrounds the elastomeric core presents, in the case of the longitudinally resilient flexible hose of U.S. Pat. No. 3,791,415, a discontinuous structure, this only imperfectly ensuring the protection and maintenance of the elastomeric core and requiring the use of a supplementary external protective sheath made of fiber yarn.

It is further to be noted that U.S. Pat. No. 3,791,415 does not give any indication concerning the composition of the elastomeric core; the patent recommends the use either of an elastomeric polymer (for cooling devices) or of a silicon elastomer (for appliances supplied with drinking water).

According to the teaching of U.S. Pat. No. 3,791,415, it therefore appears necessary to provide the use of two different types of connecting hoses, one for supplying water taken to a temperature higher that ambient temperature, and another for supplying drinking water at ambient temperature.

On the contrary, the invention allows the use of the same type of pipe for connecting an appliance supplied on the one hand with a hot water distributing network and a cold drinking water network.

Furthermore, the longitudinally resilient flexible hose of U.S. Pat. No. 3,791,415 has a complex structure and is of high cost price; in fact, to allow the longitudinal extension of the hose, it is necessary to allow the spacing out of the yarns constituting the metallic braiding and these yarns leave spaces 15 therebetween which afford a good longitudinal elasticity; these spaces 15 are covered by the sheath 16 which adheres to the wall of the elastomeric hose through the space 15; this structure is precisely intended to allow the hose to withstand and internal pressure by longitudinal extension of the tube.

The device of U.S. Pat. No. 3,791,415 is suitable for use in mobile dwellings such as boats, caravans and the like, in which the pressure and flow of water are low and may in any case be controlled and adjusted at the beginning.

In the case of connecting sanitary appliances in dwellings, the internal pressure of the network cannot be controlled and the connection must be adaptable to all conditions of flow and pressure which risk being encountered.

To this end, a connection means intended to be used for connecting both hot water and drinking water in dwellings connected to distribution networks having variable pressure and temperature conditions, must have characteristics which enable it to withstand these various conditions and the longitudinally resilient flexible hose of U.S. Pat. No. 3,791,415 does not comply with all these conditions.

The fact that the hose is longitudinally extensible for accommodating an internal excess pressure is disadvantageous in that the diameter reduces; this causes a shrinking of the hose, hence a reduction in flow; now, it is important that the flow of the appliance be constant; it is therefore desirable that a connection of this type be dimensionally stable, irrespective of the internal pressure.

However, the elastomeric core which conveys the liquid must be extremely supple and be of sufficient elasticity to allow the hose to adapt itself without tension to different radii of curvature; it is therefore suitable if the elasticity of the elastomeric core is compensated by a sheathing of the metallic braid such that said latter ensures the suppleness of the hose whilst assuring its dimensional stability and opposing any movement of extension or retraction which would modify the section of passage of the fluid.

In addition, the elastomeric core must present a perfect chemical and biological inertia in order to be able to convey drinking water without interfering therewith and without giving it any taste or odour; the biological inertia of the material must also resist the formation of efflorescence.

This same core must also enable water to be conveyed at a temperature close to 100° C. without producing parasitic conditions such as hardening, ageing, etc.

Finally, the fitting located at each end of the connection hose for coupling on the one hand on the appliance and on the other hand on the end of the distribution pipe, must afford high security, by resisting also pressure variations and temperature variations.

It is an object of the invention to comply with these various conditions.

To this end, the invention relates to a hose for connecting a sanitary appliance, supplied with water, to the distribution network, this connection hose being of the type constituted by a tubular core made of supple elastomeric material, an outer protective sheath formed of braided metallic wire, and two couplings secured at the end of said hose for connection by one end to said appliance and by the other end said distribution network, in which:

said elastomeric core is prepared according to the following formula:
ethylene propylene copolymer resin: 20 to 30%
paraffin-oil: 20 to 40%
carbon black: 40 to 60%
said sheath formed of a metallic braid is constituted by strands of stainless steel wire, each strand comprising between 3 and 8 parallel wires, the strands forming intersecting helices each strand following a line forming an angle comprised between 35° and 50° with respect to the axis of said hose, the strands surrounding the elastomeric core without discontinuity, ensuring a continuous coating around said elastomeric core.

The invention will be more readily understood on reading the following description with reference to the accompanying drawings, in which:

FIG. 1 shows a perspective view of a wash-basin equipped with the system according to the present invention.

FIG. 2 shows the wash-basin of FIG. 1 permanently installed near the open ends of distributing pipes.

FIG. 3 shows the wash-basin connected to the distributing pipe.

FIG. 4 shows a detailed view of the special flexible connection hose according to the present invention.

FIGS. 5 and 6 show a system of connecting the hose to the distributing pipe.

FIG. 7 shows a detailed view, partly in section and partly in side elevation of the connecting device according to the invention.

Referring now to the drawings, FIG. 1 shows a wash-basin comprising its sanitary equipment constituted in known manner by two faucets 2 and 2' controlling the intake of hot and cold water, as well as the swivel outlet 3; a conventional plug-hole 4 provided with a trap 5 is provided in the bottom of the basin.

In accordance with the invention, each of the intakes of cold and hot water respectively mounted at the base of the faucets 2 and 2' is associated with a flexible hose or tube 6 or 6' which is shown in greater detail in FIG. 4; each of these flexible hoses is constituted by a tubular fluid-proof core made of elastically deformable material such as a synthetic rubber; this tubular structure comprises further an outer protective and reinforcing coating constituted by braided metallic wires, or synthetic strands.

The inner tubular core is preferably constituted by a synthetic rubber and the outer protective coating is constituted by galvanised and braided steel wires.

The evacuation pipe, downstream of the trap may also comprise a hose 7 constituted, as indicated previously, by a tubular core made of rubber with an outer protective coating of braided steel wire.

These flexible tubular elements 6,6' and 7 are flexible and may therefore take any shape and configuration necessary for connecting the wash-basin 1, once in position, to the open ends of the pipes 8,8' and 9.

According to the invention, the flexibility of the connecting hoses 6,6' and 7 enables the end of the open rigid pipes 8 and 8' to be easily joined, thus avoiding the bending or welding operations of a rigid pipe connecting section, as required in the prior art.

FIG. 4 shows a detailed view of the hose 6 such as used according to the invention for flexibly connecting a sanitary appliance.

This hose comprises a tubular core 10 made of synthetic rubber coated with a metallic braid 11; the ends of this structure are crimped on metallic sleeves 12,12' comprising male and female connecting elements 13 or 13' respectively.

FIGS. 5 and 6 show by way of example a possibility of connecting the flexible hose according to the invention on the end of the open pipe 8; a nut 14 is fitted on the pipe 8 and the terminal edge of said pipe is outwardly folded so as to form a flange 15; the nut 14 may then be screwed on the element 13 integral with the flexible hose 6.

The invention enables the appliance to be equipped as early as the manufacturing stage with its flexible connecting hose so that the appliance arrives on the site already provided with this accessory fixed and connected thereto; the flexible hose may then be curved and take all inflexions or incurvations necessary to approach the end of the open distributing pipe so as to enable connection by simply screwing the nut. Assembly is therefore easy and heavy equipment does not have to be used in situ for making welds or for bending the metallic connection tubes, as previously needed.

The device according to this invention avoids the transmission of vibrations along the pipes network in a building; in fact it is known that the water distributing network is a source of noise by the vibrations that they create when fluid passes therein, for example in water distributing faucets; the supple and flexible hose used according to the invention, by the very absorbant nature of the material of which it is constituted, avoids transmission of these vibrations and consequently the undesirable sound effects caused thereby.

The core 10 is preferably made of an elastomeric resin having the following composition:
ethylene propylene copolymer from 20 to 30%
paraffin-oil from 20 to 40%
carbon black from 40 to 60%

The elastomeric resin will include the usual vulcanisation additives.

According to a preferred form, the composition of the resin constituting the core of the connection element according to the invention will have the following composition:

| Nordel | 23,5 % |
| paraffin oil | 28,5 % |
| carbon black | 45 % |
| zinc oxide | 1,2 % |
| stearic acid | 0,2 % |
| sulphur and vulcanisation agent | 1,6 % |
| TOTAL ≃ | 100 | wherein Nordel is a resin commercially available and manufactured by Dupont.

The composition thus defined has a Shore hardness of 70, a breaking strength of 120 kg per cm² and an elongation at break of 290%.

This mixture therefore has qualities of suppleness and elasticity which enable it to lend itself to the different deformations necessary for following the configuration enabling the intake of water in the sanitary appliance on the one hand to be connected to the end of the intake of the water distribution pipe on the other hand.

The composition defined here also has the advantage of being perfectly neutral from the chemical and biological point of view and it is suitable for conveying drinking water, the product giving the drinking water conveyed in the pipe no odour nor taste.

A sheath constituted by an assembly of braided strands 11 is mounted on the elastomeric core.

According to the invention, the sheath is constituted by strands comprising between 3 and 10, and preferably 7 wires.

The wire is made of tempered stainless steel having a resistance of 50kg per mm².

The pitch of the braiding during manufacture is 33mm and presents an angle of 43°; the braiding is effected under tension, the tension springs being calibrated between 0.450 and 700 grams; after relaxation on leaving the machine, the braiding undergoes a shrinkage which sheaths and tightens on the elastomeric core 10 and the pitch is returned to 30mm, the angle α formed by the line followed by each strand and the axis of the hose is substantially 45°. 7 wires of 0.22 mm are used for each strand.

In this way, a sheath is obtained which firmly holds the elastomeric core whilst ensuring a good suppleness and allowing movements of flexion of the connecting hose.

However, the sheath 11 firmly grips around the elastomer core and opposes any movement of longitudinal extension under the internal pressure; the angle α of a value of 40°, has in fact been calculated to prevent a longitudinal extension whilst maintaining the elastomeric core sufficiently well in a centrifugal direction and consequently opposing an increase in diameter under the effect of the internal pressure.

In this way, a sheathing is obtained which ensures an effective protection of the elastomeric core and a dimensional stability of the whole of the hose under variable conditions of pressure and temperature.

According to another characteristic of the invention, the connection of the tubular structure constituted by the elastomeric core 10 and the sheath 11 on the coupling 13 is obtained by means of an external sleeve 12 which is crimped on the internal collar 16 on which the elastomeric core 10 and the sheath 11 is fitted.

The width of the impression 1 is 6.5mm.

Crimping is effected in such a manner that the rubber is compressed by between 45 and 50% of its thickness.

This compression makes it possible to obtain a reliable crimping; in fact, if the compression of the rubber exceeds the threshold of 50%, the elasticity of the rubber is compromised, particularly during the passage of hot water and after a succession of hot and cold cycles; the loss of elasticity of the rubber, which has been too compressed, no longer ensures the tightness.

If the compression of the rubber is lower than the minimum threshold of 45%, the tightness obtained is not certain.

The tests and experiments carried out by Applicant have verified the behaviour of the product under operational conditions which vary in temperature and pressure.

The tests showing behaviour of the connecting hoses according to the invention upon variations of temperature and high pressures are given hereinafter.

Tests were carried out on six flexible hoses according to the invention, 0.60m in length, in each of the following diameters;

| Internal diameter (mm) | 10 | 12 | 15 | 20 | 26 | 33 |
| External diameter (mm) | 15 | 18 | 22 | 28 | 35 | 43 |

These flexible hoses are constituted by an elastomeric core of the composition defined hereinbefore, intended for ensuring tightness and by a plurality of steel braids around this core, intended fro ensuring mechanical resistance. They are provided at each end with a threaded coupling for assembly on water intake pipes.

One test consisted in successively circulating in a circuit comprising six flexible hoses, water at 80° C. for 30 mins., then water at 20° C. for 15 mins., the pressure in the circuit being 4 bars.

A minimum number of 1000 cycles (or 750 hours) was effected.

Under these conditions, all the flexible hoses remained tight for the whole duration of the test, viz. 1092 cycles (which represents 819 hours of circulation).

Another test was also carried out to show resistance to pressure, which consisted in maintaining the flexible hose for one hour under a high pressure.

The test was carried out at the following two temperatures; 20° C. and 80° C.

The values of the pressures applied are given in the following table:

| Diameter (int. and ext.) (mm) | 10×15 | 12×18 | 15×22 | 20×28 | 26×35 | 33×43 |
|---|---|---|---|---|---|---|
| Pressure applied (bars) | 60 | 40 | 30 | 20 | 15 | 10 |

The tests are carried out on four flexible hoses of each diameter two hoses per test temperature.

The results are given in the following tables:

1. Test at 20° C.

| Diameter (mm) | Test-piece | Pressure applied (bars) | Holding (hrs) |
|---|---|---|---|
| 10 × 15 | 1 | 60 | 1 |
|  | 2 | 60 | 1 |
| 12 × 18 | 1 | 40 | 1 |
|  | 2 | 40 | 1 |
| 15 × 22 | 1 | 30 | 1 |
|  | 2 | 30 | 1 |
| 20 × 28 | 1 | 20 | 1 |
|  | 2 | 20 | 1 |
| 26 × 35 | 1 | 15 | 1 |
|  | 2 | 15 | 1 |
| 33 × 43 | 1 | 10 | 1 |
|  | 2 | 10 | 1 |

2. Test at 80° C.

| Diameter (mm) | Test-piece | Pressure applied (bars) | Holding (hrs) |
|---|---|---|---|
| 10 × 15 | 1 | 60 | 1 |
|  | 2 | 60 | 1 |
| 12 × 18 | 1 | 40 | 1 |
|  | 2 | 40 | 1 |
| 15 × 22 | 1 | 30 | 1 |
|  | 2 | 30 | 1 |
| 20 × 28 | 1 | 20 | 1 |
|  | 2 | 20 | 1 |
| 26 × 35 | 1 | 15 | 1 |
|  | 2 | 15 | 1 |
| 33 × 43 | 1 | 10 | 1 |
|  | 2 | 10 | 1 |

No leakage was observed, in either of the tests 1 or 2 above.

Measurements were also made to verify the dimensional behaviour of the flexible hose according to the invention upon an internal excess pressure.

These measurements and tests which are reported in the following table show that the internal pressurisation of the flexible hose is not translated by any longitudinal extension (which would reduce the diameter and would be a source of reduction of the flow); on the contrary, an increase in the pressure provokes a slight longitudinal shrinkage and a slight radial expansion (increase of the diameter) of the hose.

| length of the tube (in cm) | pressure (in bars) |
|---|---|
| 26 | 0 |
| 25 | 5 |
| 24,5 | 20 |
| 24 | 50 |

Applicant has also made tests and measurements showing the reduction in noise level transmitted from the faucets to the whole distribution network, by using the flexible hose according to the invention.

Tests were made under a pressure of 3 bars.

| | |
|---|---|
| Acoustic level recorded with the reference faucet | 72dB |
| (a) Acoustic level recorded with the tested faucet with a rigid pipe | 57dB |
| (b) Acoustic level recorded with the same faucet provided with a flexible hose (inside diameter 8-passage to connections 6.5) flow 28 liters/minute | 43dB |

According to this example, a faucet which is at the limit of the "mediocre" class (from a noise transmission point of view) is noted to pass easily into "superior" class if it is connected to a flexible hose according to the invention.

What is claimed:

1. A hose for connecting a sanitary appliance, such as a washstand supplied with water, to a distribution pipe, wherein the hose is of the type comprised of a tubular core made of supple elastomeric material, an outer protective sheath formed of braided metallic wire, and a coupling secured at each end of the hose for connecting the hose at one end thereof to the appliance and at the other end thereof to the distribution pipe, in which:

said elastomeric core comprises the following composition,
ethylene propylene copolymer: 20 to 30%
paraffin oil: 20 to 40%,
carbon black: 40 to 60%,
said composition having a Shore hardness of 70, a breaking strength of 120 Kg per cm$^2$ and an elongation at break of 290% and being chemically and biologically neutral with respect to the water being delivered therethrough; and said sheath comprises strands of stainless steel wire, each strand comprising between 3 and 8 parallel wires, the strands forming intersecting helices, each strand following a line forming an angle between 35° and 50° with respect to the axis of said hose, each strand contacting each adjacent strand, thus defining a continuous sheath around said elastomeric core, so as to permit the hose to resist the pressure of water.

2. A hose according to claim 1 wherein said tubular core comprises a resin having the following formula

| | |
|---|---|
| ethylene propylene copolymer resin | 23,5 % |
| paraffin oil | 28,5 % |
| carbon black | 45 % |
| zinc oxide | 1,2 % |
| stearic acid | 0,2 % |
| sulphur and vulcanisation agent | 1,6 % |
| Total ≃ | 100 |

3. A hose according to claim 1 wherein said sheath is constituted by strands comprising 7 wires of tempered stainless steel, the strands forming an angle of substantially 45° with respect to the axis of the hose.

4. A hose according to claim 1 wherein each coupling comprises an internal collar on which the elastomeric core and the sheath is fitted, and an external sleeve crimped on said collar with said core and sheath fitted thereon, said crimping being effected in such a manner that the core is compressed by between 45 and 50% of its thickness.

* * * * *